April 8, 1924.
T. KARDONG
MILLING MACHINE
Filed July 21, 1920
1,489,532
3 Sheets-Sheet 1
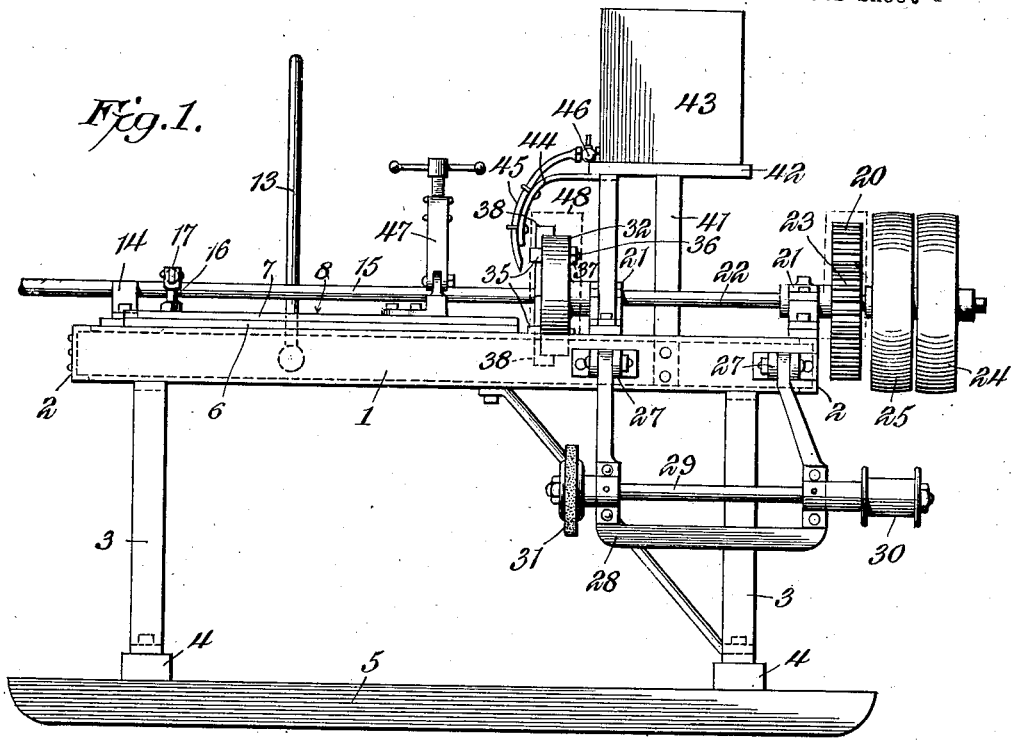
WITNESSES
Howard D. Orr.
F. T. Chapman.
Theodore Kardong, INVENTOR,
BY E. G. Siggers.
ATTORNEY April 8, 1924.
T. KARDONG
MILLING MACHINE
Filed July 21, 1920
1,489,532
3 Sheets-Sheet 2
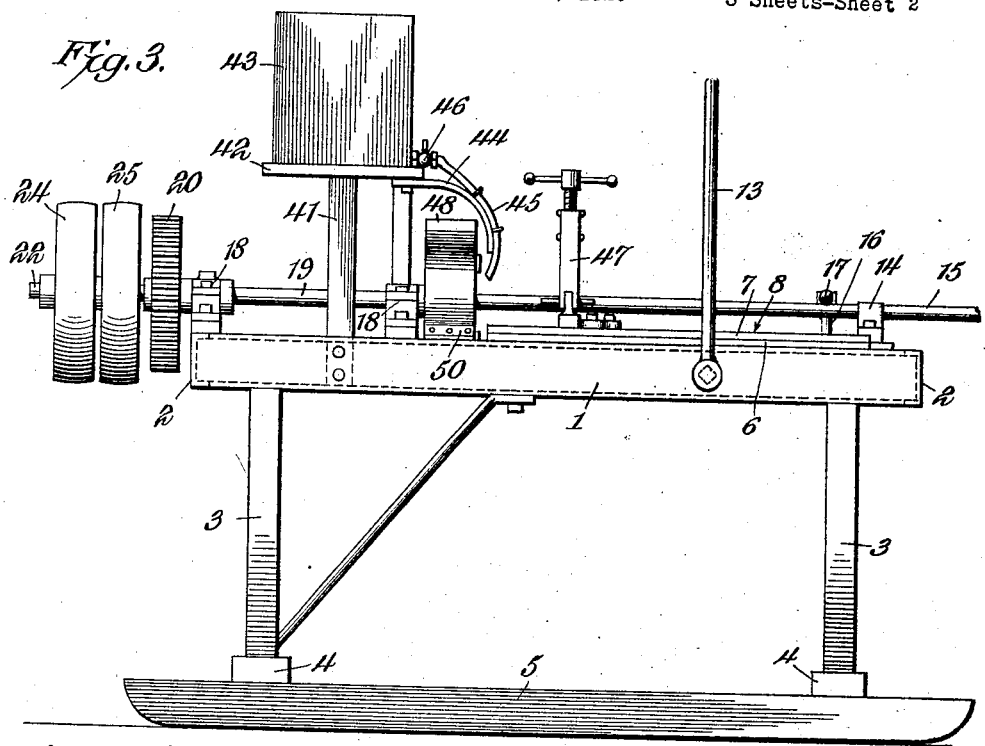
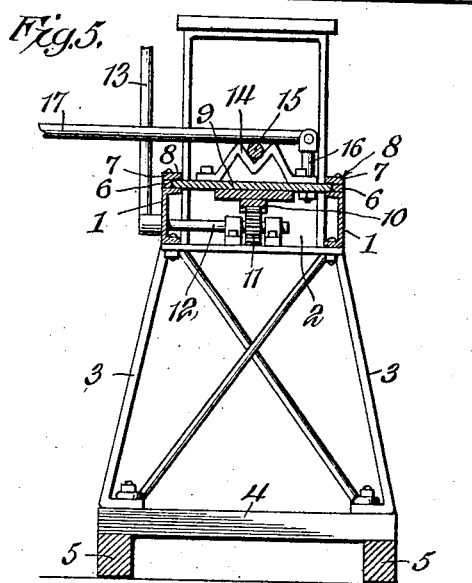
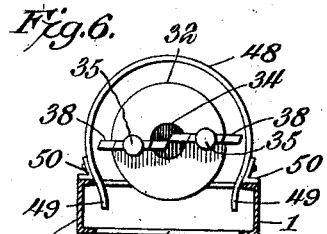
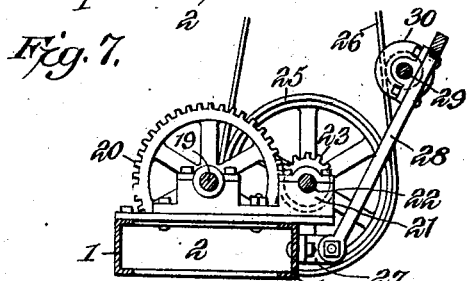
Theodore Kardong, INVENTOR,
WITNESSES
BY
ATTORNEY April 8, 1924.
T. KARDONG
MILLING MACHINE
Filed July 21, 1920     3 Sheets-Sheet 3
1,489,532
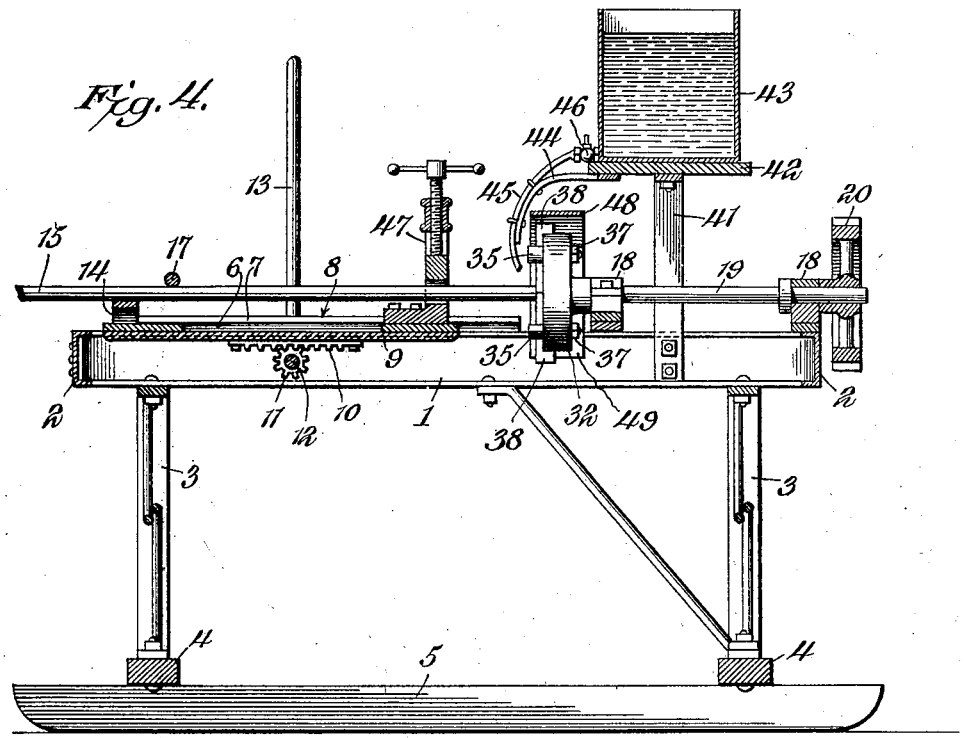
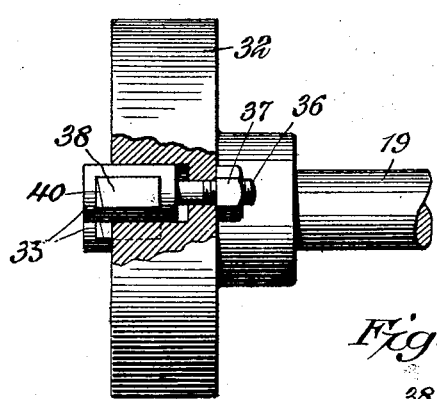
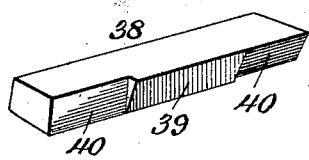
Theodore Kardong,
INVENTOR,
WITNESSES
BY
ATTORNEY Patented Apr. 8, 1924.

UNITED STATES PATENT OFFICE.

THEODORE KARDONG, OF MINNEAPOLIS, MINNESOTA.

MILLING MACHINE.

Application filed July 21, 1920. Serial No. 397,854.

*To all whom it may concern:*

Be it known that I, THEODORE KARDONG, a citizen of the United States, residing at Minneapolis, in the county of Hennepin and State of Minnesota, have invented a new and useful Milling Machine, of which the following is a specification.

This invention has reference to milling machines and its object is to provide a readily constructed, cheap and efficient machine for the purpose that can be quickly transported and is capable of either shop or field work.

In accordance with the invention there is provided a suitable frame which may be mounted on skids for ready transportation, and which will hold its place during operation, either in the shop or in the field. Provision is made for clamping the work in order to hold it while being treated and which will permit the work to be fed to suitable milling tools, the machine being adapted to be driven by a source of power, which source, since the work only requires moderate power, may be furnished by an explosion engine, especially where facility of transportation is of importance.

The invention is designed particularly for milling the ends of reinforcing rods used in reinforced concrete work. Such rods are customarily sheared off to desired lengths and this leaves ends ragged and uneven when the bars are cut. Therefore the ends of such bars are milled off smooth and it is the purpose of the machine of the invention to perform such operation accurately and quickly. It is found in practise advantageous to employ a plurality of milling blades, the best results being obtained by the use of two blades located on opposite sides of the axis of rotation, although good results may be obtained by one or more blades. Moreover, especially in the field, provision is made for frequent sharpening of the blades thus keeping the machine in good cutting condition.

The invention will be best understood from a consideration of the following detailed description taken in connection with the accompanying drawings forming part of this specification, with the understanding, however, that the invention is not confined to any strict conformity with the showing in the drawings, but may be changed and modified so long as such changes and modifications mark no material departure from the salient features of the invention as expressed in the appended claims.

In the drawings:

Fig. 1 is a side elevation of the machine.

Fig. 2 is a plan view thereof.

Fig. 3 is a side elevation of the side of the machine remote from that shown in Fig. 1 and omitting the grinding wheel there shown.

Fig. 4 is a longitudinal vertical section of the structure shown in Fig. 1.

Fig. 5 is a vertical section of the machine adjacent to the right hand end of Fig. 3.

Fig. 6 is a section of the bed of the machine adjacent to the milling wheel.

Fig. 7 is a section of the bed adjacent to the driving gear.

Fig. 8 is a side elevation of the milling head showing parts thereof in section.

Fig. 9 is a face view of the milling head.

Fig. 10 is a perspective view of one of the milling tools.

Referring to the drawings there is shown a frame composed of side and end members 1, 2 so joined as to make a substantially rectangular structure and this frame is mounted upon uprights or legs 3 carried by cross pieces 4 joining skids or runners 5, which latter are arranged parallel to each other. The runners are advantageous over wheels, or over fixed supporting structures, in that there is always the capability of moving the supporting frame work from place to place, wherefore it may be used in the shop or in the fields as desired and, at the same time, the runners hold the machine steady. The frames 1 and 2 constitute a bed which may be conveniently made of structural metal and along the long sides of the bed are inset strips 6 held to the side members of the frame, which side members are of channel form, by top strips 7 wider than the strips 6. This provides opposed guides 8 for receiving and retaining a slide or carriage 9, carrying a rack member 10 engaged by a pinion 11 mounted on a rock shaft 12 appropriately journaled in the frames 1 and 2. The structure provides for the longitudinal movement of the slide or carriage 9 by manipulating a handle or lever 13 fast to the rock shaft 12.

The slide 9 carries a cradle 14 designed to receive an appropriate part of a rod 15, constituting a reinforcing rod for reinforced concrete work. Pivoted to the posts 16, rising from one side of the slide 9, is a clamp arm 17 so arranged as to extend transversely over the rod 15 when lodged in the cradle 14 whereby the rod 15 may be held to the cradle and participate in movements thereof and also be prevented from slipping in the cradle.

That portion of the bed member remote from the end thereof carrying the rod 15 is provided with journal bearings 18, in which is mounted a shaft 19 extending longitudinally and centrally of the bed 1. The shaft 19 carries a gear wheel 20. Journaled on the bed 1 to one side of the shaft 19 and supported by other journal bearings 21 is another shaft 22 having fast thereon a pinion 23 meshing with the gear wheel 20. Carried by the shaft 22 are tight and loose pulleys 24 and 25 respectively and so arranged that a belt 26 may be applied to these pulleys to drive one of them and to idly turn the other. When the belt 26 is acting upon the tight pulley 24 motion is transmitted to the shaft 22 and through the pinion 23 and gear wheel 20 this motion is transmitted at reduced speed to the shaft 19.

Mounted on one of the side beams of the frame 1 are hinged supports 27 for a frame 28 carrying at the end remote from the hinges a shaft 29 in turn carrying at one end a pulley 30 opposite the loose pulley 25 and at the other end carrying a grinding wheel 31. The arrangement is such that when the frame 28 is lifted about its hinges 27 so that the pulley 30 engages the belt 26 then engaging the loose pulley 25, the grinding wheel 31 is caused to rotate, but the machine as a whole is idle because the belt at the time is on the loose pulley. The belt, however, is traveling and therefore the pulley 30 and the grinding wheel 31 are also driven. When the frame 28 is permitted to move downwardly by gravity or otherwise the pulley 30 is carried away from the driving belt, and therefore the grinding wheel 31 is stopped.

The shaft 19 carries a milling head 32 shown as in the form of a disk with slots 33 across the face of the head remote from the shaft 19. These slots open into a central cavity 34 and each is traversed by an eye bolt 35 extending through the slot and provided with a threaded stem 36 to which is applied a holding nut 37. The eye bolts are shaped to each receive a cutting tool 38 with a central gripping portion 39 and terminal cutting portions 40. Rising from the bed 1 in appropriate relation to the milling head 32 is a support 41 carrying a table 42 for receiving a reservoir or tank 43 for cooling solution to wet or lubricate the milling head. Carried by the tank 43 is a guiding support 44 for a hose or duct 45 and directed into suitable discharging relation to the cutting face of the milling head. A stop cock or valve 46 in the pipe 45 provides for the feed of the cooling solution or lubricant to the work.

In order to firmly hold the rod 15 to the slide or carriage 9 a pipe, bench vise 47 is made fast to the carriage 9 so that the rod is positively constrained to move with the carriage while being milled, it being held at the other end by the clamp arm 17.

In order to prevent throwing of the water or other lubricant used, and of particles of metal, there is provided a band or strip 48 having ends 49, which may be slightly curved, adapted to enter between the sides of the bed 1 to be there held by the expansive force of the strip or shield. To aid in the holding of the shield in position brackets 50 are secured to the sides of the bed 1. By making the shield 48 in the form of a band of spring metal the shield may be placed in position or removed with respect to the milling head at will, thus facilitating the sharpening of the cutting tools when desired.

The cutting blades or tools 38 are made to overlap slightly, say about $\frac{1}{16}''$, at the center of the milling head with the blades substantially parallel and on opposite sides of a radius of the head, this arrangement having proven in practise to be important, and the blades follow the arrangement of the slots 33 in that they are related so as to produce a clean smooth cut flat across the end of the reinforcing rod being treated.

While good results may be obtained by the use of one or more cutters the best results are had with two cutters on opposite sides of the center of rotation.

The grinding or sharpening wheel 31 is of especial value when the machine is used in the field, for it then forms a permanent part of the machine in position to be readily applied to the blades to sharpen them and is not liable to being misplaced.

What is claimed is:

1. A milling machine comprising a supporting frame, a shaft at one end and extending lengthwise of the frame, a milling head fast to the shaft and provided with transverse milling tools, a carriage on the head movable axially toward and from the shaft and milling head, and clamping means for holding one end of a rod on the carriage in axial alinement with the milling head, and a cradle and a cooperating lever for holding the other end of the rod.

2. A milling machine, comprising a supporting frame, a shaft mounted thereon to rotate about its longitudinal axis, a milling tool on the shaft, a carriage on the machine having means for holding a rod thereon in position to be engaged by the milling tool, said means consisting of a cradle and a pivoted clamp arm extending transversely of the cradle and the machine to one side of the latter, said clamp arm being horizontally disposed when in its holding position, and means for moving the carriage longitudinally consisting of a normally vertically disposed handle located on that side of the machine to which the said clamp arm extends and connected to said carriage, said handle and said clamp arm being accessible to the same operator at one side of the machine.

3. A milling machine comprising a suitable frame, a milling head mounted thereon for rotation and having means for holding cutters thereon to engage the end of a bar to be milled, a carriage mounted on the frame for movement toward and from the milling head, means for effecting such movement, means on the carriage for gripping the bar thereto adjacent to the cutting head, and other means on the carriage more distant from the cutting head to seat the bar and to center and clamp it on the carriage.

4. A milling machine comprising a suitable frame, an elongated bed carried thereby, a carriage on the bed slidable lengthwise thereof, a bar gripping clamp on the carriage movable therewith, a cradle on the carriage for supporting the bar at a point distant from the bar gripping means, a clamping bar associated with the cradle, means for feeding the carriage, and a rotatable milling head lined with the path of movement of the carriage to mill the end of a bar mounted thereon.

5. In a milling machine, an elongated bed structure, a carriage mounted thereon for movement lengthwise of the bed structure, means for effecting the longitudinal movement of a rod clamped on the carriage, a cradle on the carriage for supporting the rod and permitting it to be moved lengthwise of the carriage, clamping means on the carriage for the rod, a shaft journaled on the bed in line with a rod mounted on the carriage, a milling tool on the shaft in position to engage one end of the rod, and driving means for the shaft whereby the milling tool may be rotated in engagement with the end of the rod fed thereto.

6. The combination with a main frame, a drive shaft, a milling cutter driven thereby, driving mechanism for the shaft including tight and loose pulleys and a belt, a frame hinged to the main frame at one side thereof between the cutter and the driving mechanism, a longitudinal shaft mounted in the last mentioned frame, said shaft having a grinding wheel at one end and a pulley at the other end opposite the loose pulley to cooperate with the belt of said driving mechanism when said belt is in engagement with the loose pulley, upon the raising of the hinged frame.

In testimony that I claim the foregoing as my own, I have hereto affixed my signature.

THEODORE KARDONG.